(12) United States Patent
Pfitzner et al.

(10) Patent No.: US 9,089,926 B2
(45) Date of Patent: Jul. 28, 2015

(54) PROCESS MONITORING THE PROCESSING OF A MATERIAL

(75) Inventors: Dieter Pfitzner, Weil der Stadt (DE); Tim Hesse, Ditzingen (DE); Winfried Magg, Ditzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 1462 days.

(21) Appl. No.: 12/513,081

(22) PCT Filed: Nov. 4, 2006

(86) PCT No.: PCT/EP2006/010585
§ 371 (c)(1),
(2), (4) Date: Jan. 14, 2010

(87) PCT Pub. No.: WO2008/052591
PCT Pub. Date: May 8, 2008

(65) Prior Publication Data
US 2010/0134628 A1    Jun. 3, 2010

(51) Int. Cl.
H04N 7/18    (2006.01)
B23K 26/03   (2006.01)
G01J 5/60    (2006.01)
G01J 5/00    (2006.01)

(52) U.S. Cl.
CPC .............. B23K 26/03 (2013.01); B23K 26/032 (2013.01); B23K 26/034 (2013.01); G01J 5/602 (2013.01); *G01J 2005/0077* (2013.01)

(58) Field of Classification Search
None
See application file for complete search history.

(56) References Cited

U.S. PATENT DOCUMENTS

| 4,817,020 | A  |   | 3/1989  | Chande et al. |
| 4,980,847 | A  |   | 12/1990 | Hirano |
| 5,011,295 | A  | * | 4/1991  | Krishnan et al. ............... 374/126 |
| 5,225,883 | A  | * | 7/1993  | Carter et al. .................... 356/45 |
| 5,822,222 | A  |   | 10/1998 | Kaplinsky et al. |
| 6,130,466 | A  | * | 10/2000 | Schneider et al. ............ 257/440 |
| 6,344,625 | B1 |   | 2/2002  | Kim et al. |
| 6,822,188 | B1 | * | 11/2004 | Kratzsch et al. ......... 219/121.64 |
| 2002/0158053 | A1 |   | 10/2002 | Kessler et al. |
| 2003/0095746 | A1 | * | 5/2003  | Williamson .................... 385/33 |

(Continued)

FOREIGN PATENT DOCUMENTS

| DE | 10120251       | 3/2006 |
| DE | 102004051876   | 4/2006 |
| DE | 102004051876 A1 | 4/2006 |

(Continued)

OTHER PUBLICATIONS

Chen et al., "Laser Process Monitoring with Dual Wavelength Optical Sensors", 12288 ICALEO '91 Laser Materials Processing, Nov. 3-8, 1991, San Jose, CA, pp. 113-122.

(Continued)

*Primary Examiner* — Thomas Dailey
*Assistant Examiner* — Nam Tran
(74) *Attorney, Agent, or Firm* — Fish & Richardson P.C.

(57) ABSTRACT

A method for monitoring a processing region of a workpiece on which laser processing is being carried out, in which method the radiation emitted by the processing region is detected by a detector system in a space-resolved manner, wherein the radiation of the processing region is detected for each elemental area of the processing region imaged onto the detector system at least two wavelengths simultaneously. Accurate process monitoring may thereby be carried out.

16 Claims, 2 Drawing Sheets

(56) References Cited

U.S. PATENT DOCUMENTS

2004/0188397 A1    9/2004  Connally et al.
2005/0252895 A1*  11/2005  Schuermann et al. ... 219/121.83

FOREIGN PATENT DOCUMENTS

| | | |
|---|---|---|
| DE | 102005018124 A1 | 10/2006 |
| EP | 1693141 | 8/2006 |
| JP | 56039433 A | 4/1981 |
| JP | 9152377 A | 6/1997 |
| JP | 2002323381 A | 11/2002 |
| JP | 2003065985 A | 3/2003 |
| JP | 2004045306 A | 2/2004 |

OTHER PUBLICATIONS

International Search Report from corresponding PCT Application No. PCT/EP2006/010585, mailed Aug. 31, 2007, 6 pages.

Preliminary Report on Patentability for corresponding PCT Application No. PCT/EP2006/010585, mailed May 5, 2009, 7 pages, with the English translation mailed Jun. 10, 2009, 7 pages.

Dilthey, "Laserstrahlschweissen", Qualifizierung von Laserverfahren im Rahmen des Förderkonzeptes Laser, English Translation, 2000.

English Abstract of Müller-Borhanian, "Intergration optoscher Messmethoden zur Prozesskontrolle beim Laserstrahlschweissen", http:/www.iness-projekt.de, Sep. 2005.

* cited by examiner

PROCESS MONITORING THE PROCESSING OF A MATERIAL

FIELD OF THE INVENTION

The invention relates to a method for monitoring a processing region of a workpiece on which laser processing is being carried out, in which method the radiation emitted by the processing region is detected by a detector system in a space-resolved manner, and to an apparatus for monitoring laser processing of a workpiece, having a filter arrangement and a detector system.

BACKGROUND OF THE INVENTION

In laser processing procedures it is often desirable and even necessary to ascertain the temperatures within a predefined processing region during the processing operation in order, for example, to be able to make inferences regarding the particular quality to be adhered to during the processing operation and the adherence to specific processing regions, but also for the feedback control for the processing operation.

Since during the processing operation the temperatures at the different positions of a respective processing region vary locally and over time in dependence on a number of parameters such as, for example, the respective laser output power used in the processing operation, the deflection speed and/or direction of laser beams, and the respective workpiece to be processed, space-resolved determination of temperatures within a processing region is desirable.

Known systems measure and assess the welding process with individual photodiodes or CCD/CMOS cameras. In that method, infrared radiation is captured in the form of a simple radiation intensity measurement. In the case of those radiation measurements, inter alia absolute temperature, emission coefficient, illumination of the measurement field etc. are superposed. Furthermore, radiation intensity measurements are highly dependent on fouling of the optical systems, smoke and plasma in the observation beam path. Assessment of a process using intensity measurements is therefore inaccurate.

An arrangement for space-resolved temperature measurement is known from DE 10 2004 051 876 A1, wherein a predefinable processing region of a workpiece can be imaged onto an optical detector measuring in a space-resolved manner, and at least one optical filter that blocks the electromagnetic radiation of one or more laser processing beams is disposed in the beam path between the processing region and the optical detector.

SUMMARY OF THE INVENTION

The object of the present invention is to provide a method and an apparatus with which improved quality control is possible.

That object is attained by a method of the kind mentioned in the introduction, in which the radiation of the processing region is detected for each surface element of the processing region imaged onto the detector system at at least two wavelengths simultaneously. The data obtained for two wavelengths may be analyzed and set in relation to each other. The processing region comprises, in the sense of the specification, the keyhole, the molten film surface thereof, the surrounding weld pool produced in laser welding, the wake of a weld pool, the solidified material and a surrounding heat-affected zone. By suitable analysis it is possible to calculate temperature gradients in the wake of the weld pool, in the solidified molten material and in the heat-affected zone. It is thereby possible, for example, to characterize the dissipation of heat into the workpiece. In addition, internal weld seam faults, such as lack of fusion, may be detected. It is also possible to determine the influence of the material, such as, for example, hardening. It is furthermore possible to ascertain the actual weld pool dimensions on the basis of the phase transitions from molten to solid. Ultimately, a characterization of the coupling of energy into the material and hence an inference as to internal weld seam characteristics, such as variations in the penetration depth, lack of fusion at the lap joint etc., is possible. The method is therefore suitable for monitoring the process and especially the quality of the processing procedure and the weld seam produced.

In an especially preferred variant of the method, it may be provided that a temperature, especially an absolute temperature, and/or an emission coefficient is/are determined from the detected radiation for each elemental area detected by the detector system. The determination of the absolute temperature and the emission coefficient from the radiation measured at least two wavelengths may be performed by proportional radiation pyrometry methods known per se and/or by analytically fitting the electromagnetic radiation to physical radiation laws. For this, the radiation of each detected elemental area on the workpiece is converted by means of analytical separation into an absolute temperature and an emission coefficient. An image of temperature values of the keyhole, its molten film surface, the molten material surrounding the keyhole, the wake of the weld pool, the solidified material and the heat-affected zone is thus obtained, with the additional, unequivocal information of the phase transition from molten to solid.

It is especially preferred if, based on the temperature, especially the absolute temperature, and/or the emission coefficient, a quality assessment is carried out. The method according to the specification is more accurate than known methods. For example, a molten zone on which an oxide layer has already formed can be analyzed more accurately. Owing to the oxide layer, there is a higher emission coefficient in that zone compared with the molten material, while both zones - with and without oxide layer - exhibit similar temperatures. In the case of known methods, such a region is wrongly detected as solidified molten material, since the analysis of the phase transition from molten to solid is based on a change in radiation intensity brought about by the different emissivity. By separate analysis of the temperature and the emission coefficient, a jump in the emission coefficient but only a slight change in the absolute temperature will occur at such a site. The contour and the size of the molten phase can be ascertained by determining the regions in which the absolute temperature is below the melting point of the material. Furthermore, the effect of the temperature and the emission coefficient having an opposite effect to each other is compensated for. A high absolute temperature at a low emission coefficient wrongly results in lower measured values for radiation intensity or, in the camera image, in darker representation of an open weld pool in contrast to the solid material. Accordingly, in the case of the known, simple radiation intensity measurement, a lower measured temperature of a weld pool in contrast to the solidified or solid material is wrongly determined.

In addition to the detection of the actual phase transition from molten to solid, absolute temperatures also afford better means of assessment for the solidified material and the heat-affected zone. Temperature gradients over time and/or space may be ascertained here with great accuracy and may be used to express the quality of the welded joint.

In one advantageous variant of the method, it may be provided that the radiation emitted by the processing region is split into a plurality of individual beam paths and the individual beam paths are filtered. It is thereby possible for the radiation radiated from a elemental area to be detected and analyzed at differing wavelengths. The splitting of the radiation ascertained may be performed, for example, with a beam splitter. Alternatively, the radiation may be coupled into fiber optics that are associated with different elemental areas and at the ends of which a wavelength-selective detection of the radiation takes place.

In an especially simple manner, the radiation emitted by a elemental area may be detected at least two wavelengths if optical filtering for at least two wavelengths is carried out for each elemental area.

Further advantages of the invention are obtained when a plurality of wavelength-dependent images of the processing region are produced. From those thermographic images of the process it is possible to ascertain the actual temperature image and an emission coefficient image. It is thus possible for the temperature distribution in the processing region and the emission coefficient distribution in the processing region to be represented graphically and evaluated in a simple manner.

The scope of the invention also includes an apparatus of the kind mentioned in the introduction, wherein at least two sensor elements each having an optical filter associated therewith are associated with each imaged elemental area, and wherein the filters filter the emitted radiation at different wavelengths. The same filter may be associated with a plurality of sensor elements—for various elemental areas. It is also possible, however, for each sensor element to have its own filter. An apparatus of that kind is suitable for carrying out the method of the invention, so that the advantages mentioned in relation to the method may be obtained. Preferably, the apparatus according to the invention forms a unit with a laser beam welding apparatus. It is thereby possible for the analysis and quality control to be performed simultaneously with laser processing of the material. A short interval in time or space between the welding process and the process monitoring operation may be tolerated here.

In order to be able to perform the analysis of the radiation recorded at different wavelengths it is advantageous for an evaluating device to be provided for determining a temperature value and/or an emission coefficient for each elemental area.

In a preferred embodiment, a beam splitter may be provided in the beam path. By means of a beam splitter, the radiation radiated from the processing region may be split into a plurality of individual beam paths and imaged onto a suitable detector system by optical imaging systems in selective, narrow-band spectral ranges. In particular, in that operation a plurality of images may be produced on one detector. From those thermographic images of the process it is possible to calculate a temperature image and an image of the emission coefficients.

As the detector system, a matrix camera, for example, may be provided. Preferably, the matrix camera has a spectral sensitivity that is suitable for the temperature radiation to be measured, that is, has a sufficiently high spectral sensitivity. Alternatively, a plurality of individual cameras, especially matrix cameras, may be provided as the detector system, with a single, selective spectral range being imaged onto each individual camera. The or at least one matrix camera may be made from different semiconductor materials.

Suitable cameras are detectors for the radiation range from the visual spectral range through near-infrared to far-infrared. Suitable cameras of the detector system are, for example, CCD, CMOS and/or InGaAs cameras, but that list is by no means exhaustive and other types of camera may be used. When individual cameras are used it is also possible for a plurality of different cameras to be combined. For example, for different spectral ranges to be measured, different cameras with various spectral sensitivities may be used.

In a preferred embodiment of the invention, it may be provided that the detector system comprises a plurality of photodiode arrays. The photodiode arrays may comprise one or more photodiodes. The photodiode arrays may be in the form of spectrally narrow-band single or multiple diodes so that the appropriate radiation component may be detected for each elemental area in the processing region simultaneously. The multiple or single diodes may be made from different semiconductor materials.

In one advantageous embodiment, fiber optics and/or optical imaging systems may be arranged in the beam path in front of the photodiode arrays. The photodiode arrays may form a matrix sensor. The photodiodes or fiber optics, and the images of the elemental areas of the workpiece, may be in any desired arrangement relative to one another.

By means of the filter arrangement, the radiation of each elemental area detected may be filtered at least two wavelengths, so that two image points having differing spectral radiation information are produced from each elemental area. The filter arrangement may be integrated in the camera matrix, arranged on the matrix surface in front of the individual sensor elements or provided between the beam splitter and the detector system. Furthermore, the filter arrangement may be integrated in the beam splitter mirror or arranged on or integrated in the beam splitter.

It is furthermore conceivable for the filter arrangement to comprise a chessboard pattern, a striped pattern or an arrangement of optical single filter elements. In particular, the filter arrangement may be suitably selected according to the detector system used or the local temperature measurement range required. In other words, the wavelengths of the filters of the filter arrangement may be matched to the temperature range that is to be measured. Larger filters are preferably used in combination with matrix cameras. The radiation of the total processing region is split into a plurality of beam paths by a beam splitter in a spectrally neutral or spectrally selective manner. In that procedure, each beam path is passed to a wavelength filter disposed behind the beam splitter and in front of or on the matrix arrangement. Alternatively, the optical filter may be mounted on the beam splitter or the beam splitter mirror itself. Thus, the radiation of the total processing region is filtered. If individual diodes are used, a small filter element may be associated with each diode and hence with each elemental area of the processing region, so that only the radiation emitted by one elemental area is filtered by the filter element.

The measuring arrangement is calibrated with a reference radiation source. There is preferably used for that purpose a full radiator having a homogeneous temperature and a homogeneous temperature distribution over its reference radiation surface. The reference radiation is first imaged on the detectors by means of the apparatus/optical system employed and then calibration of each matrix/detector element is performed.

Further features and advantages of the invention will be apparent from the following description of illustrative embodiments of the invention with reference to the Figures of the drawings which show inventively significant details, and from the claims. The individual features may each be implemented individually or a plurality thereof may be implemented in any desired combination in a variant of the invention.

BRIEF DESCRIPION OF THE DRAWINGS

Preferred illustrative embodiments of the invention are shown schematically in the drawings and will be described in detail hereinafter with reference to the Figures of the drawings, in which.

DETAILED DESCRIPTION OF THE PREFERRED EMBODIMENTS

Figure 1:
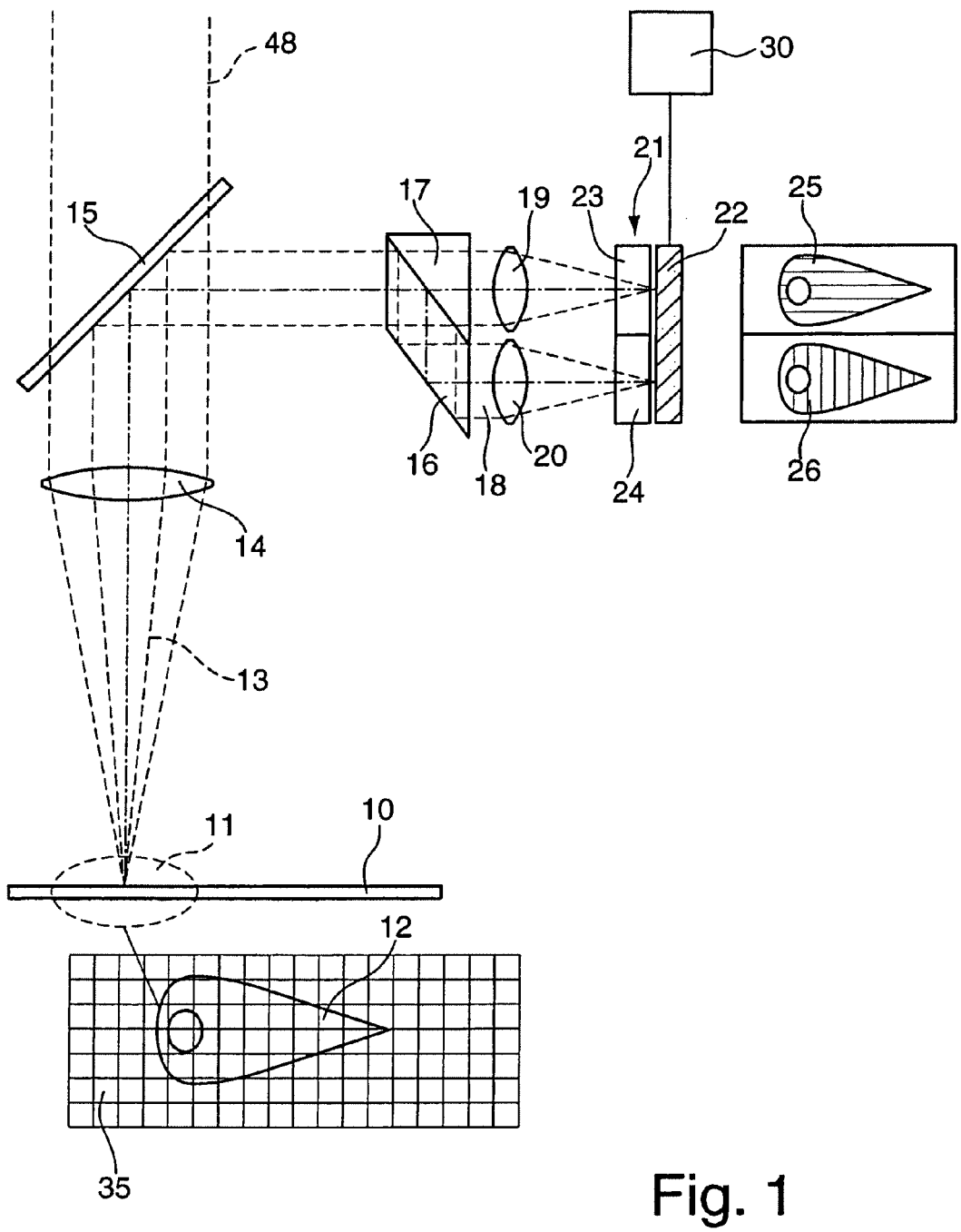
FIG. 1 is a first schematic illustration of a first apparatus for quality control of laser processing.

FIG. 1 shows a workpiece 10 which is being processed with a laser beam 48. In a processing region 11 of the workpiece 10, a weld pool 12 forms which emits electromagnetic radiation 13. The electromagnetic radiation 13 passes via an optical focusing system 14 onto a beam splitter mirror 15 and to a beam splitter 16 which may be in the form of a prism.

Figure 2:
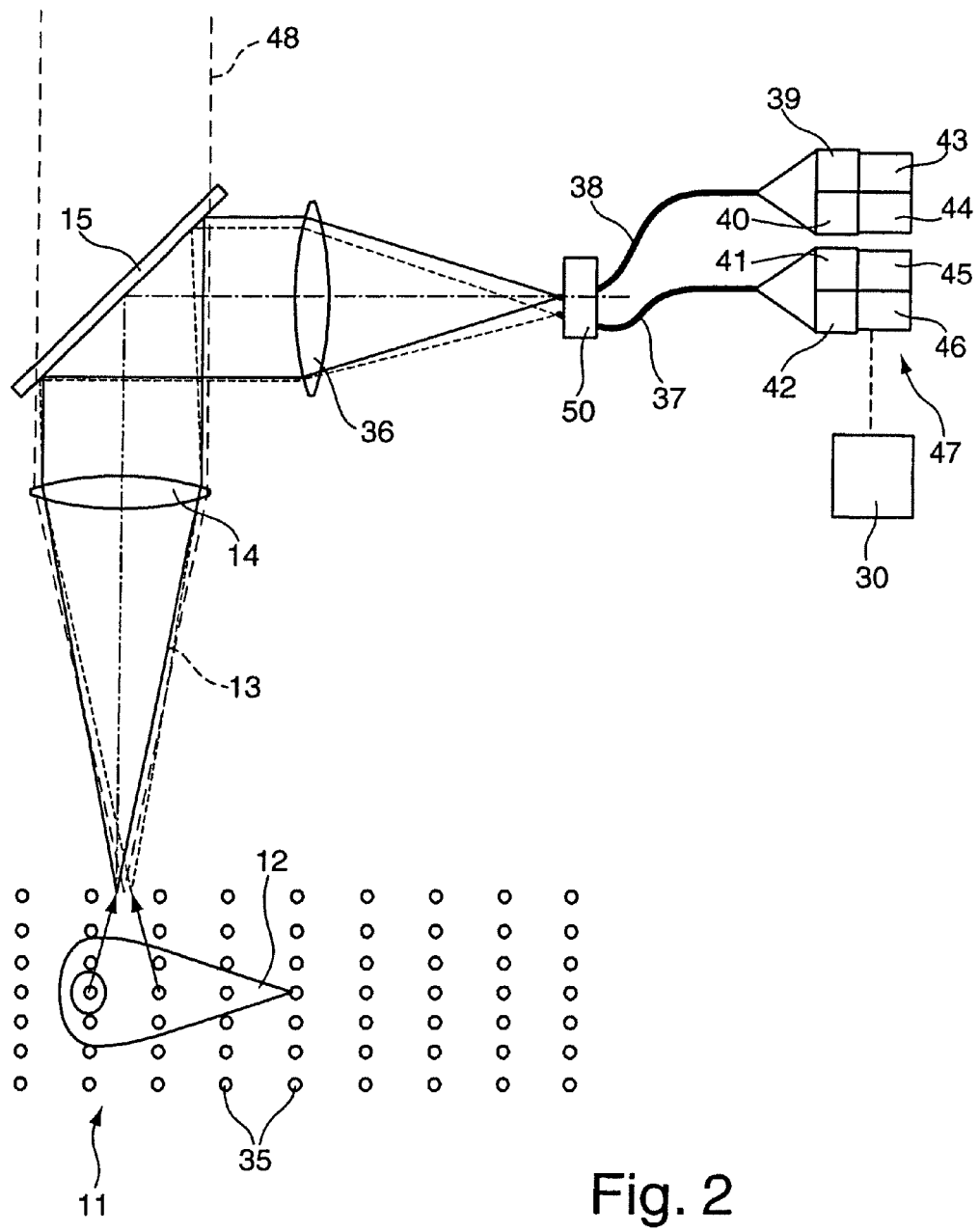
FIG. 2 is a second schematic illustration of a second apparatus for quality control of laser processing.

As shown in FIGS. 1 and 2, the beam splitter mirror 15 may be configured to be highly transmissive for the laser radiation 48 and reflective for the wavelength ranges for thermography. Other variants are possible, such as an arrangement in which the beam splitter mirror 15 is configured to be highly reflective for the laser radiation and highly transmissive for the wavelength ranges for thermography.

The beam splitter 16 splits the electromagnetic radiation 13 into a plurality of beam paths 17, 18. The beam paths 17, 18 pass via a respective imaging optics 19, 20 in the form of an optical focusing system and via a filter arrangement 21 onto a detector system 22 in the form of a matrix camera. The optical focusing system may comprise a lens and/or a mirror. The imaging optics 19, 20 are configured in such a manner as to compensate for image distortion due to chromatic aberration. In addition, especially for axial and lateral positioning, the optics 19, 20 may be configured to be displaceable together in the beam direction and laterally and also to be adjustable relative to each other.

The filter arrangement 21 comprises a first filter 23 for filtering a first wavelength and a second filter 24 for filtering a second wavelength. By means of filtering, therefore, a spectral selection takes place and two different radiation images 25, 26 of the processing region 11 are produced on the detector system 22. From those radiation images 25, 26 it is possible to ascertain by analytical methods an absolute temperature and an emission coefficient for each elemental area of the processing region 11. The analysis is performed in an evaluating device 30. The absolute temperature and/or the emission coefficient provide in turn information on the quality of the processing operation.

As shown in FIGS. 1 and 2, a processing region 11, which comprises the keyhole, the weld pool, the solidified molten material and the heat-affected zone, is divided into a plurality of elemental areas 35. According to FIG. 2, the radiation emitted by the elemental areas 35 passes via an optical focusing system 14 onto a beam splitter mirror 15. Arranged in the beam path of the electromagnetic radiation 13 is an imaging optic 36 which couples the radiation of each individual elemental area 35 into fiber optics 37, 38 held at one end by a holder 50. The radiation passes via the fiber optics 37, 38 to filter elements 39-42, with two filter elements 39-42 being associated with each elemental area 35 and hence with each fiber optic 37, 38. The radiation filtered by the filter elements 39-42 is detected by sensor elements formed by photodiodes 43-46 of a photodiode array 47. Thus, once again, different spectrally selective radiation measurement points, which may be analyzed by an evaluating unit 30, are obtained for each elemental area 35. In particular, a temperature and/or an emission coefficient may be determined for each elemental area 35. The number of elemental areas 35 analyzed is determined by the number of sensor elements. The photodiode array 47 forms the sensor system.

The optical fibers 37 and the image points 35 imaged may be imaged in the form of a matrix or any other desired arrangement (circle, line, cross etc.) relative to one another on the workpiece.

What is claimed is:

1. A method for monitoring a processing region of a workpiece on which a laser processing operation is being carried out, the method comprising:

detecting the radiation emitted by the processing region in a space-resolved manner, wherein the processing region is divided into a grid comprising a plurality of unit areas, each unit area of the grid representing a corresponding elemental area of the processing region, and wherein detecting the radiation emitted by the processing region comprises detecting the radiation for each elemental area at least two wavelengths simultaneously;

optically filtering, for each elemental area, the at least two wavelengths;

producing, for each wavelength of the at least two wavelengths, a corresponding image of the processing region, wherein the image is based on the radiation detected at the wavelength;

determining, for each elemental area, an emission coefficient from the images; and performing a quality assessment of the laser processing operation based on the determined emission coefficients, wherein the processing region comprises one or more selected from the group consisting of a key hole, the molten film surface of a keyhole, a weld pool produced in laser welding, a wake of a weld pool, solidified material, and a heat-affected zone.

2. An apparatus for monitoring laser processing operation on a workpiece, the apparatus comprising:

a detector system with sensor elements for detecting radiation emitted from each of a plurality of elemental areas of a processing region, each elemental area corresponding to a unit area of a grid into which the processing region is divided, wherein radiation emitted from each plurality of elemental area is detected by at least two of the sensor elements;

a filter arrangement with optical filters, wherein at least one of the optical filters is associated with at least one of the sensor elements, and wherein optical filters associated with sensor elements detecting radiation emitted from the same elemental area filter the radiation at differing wavelengths such that two image points of the processing region having different spectral radiation information are produced from each of the plurality of elemental areas; and an evaluation device for determining at least an emission coefficient for each of the plurality of elemental areas based on the image points and performing a quality assessment of the laser processing operation based on the emission coefficients.

3. The apparatus of claim 2, wherein the detector system includes at least one matrix camera.

4. The apparatus of claim 3, wherein at least one matrix camera includes different semiconductor materials.

5. The apparatus of claim 2, wherein the detector system includes a plurality of individual cameras.

6. The apparatus of claim 2, wherein the detector system comprises a plurality of photodiode arrays.

7. The apparatus of claim 6, wherein the photodiodes of the plurality of photodiode arrays include different semiconductor materials.

8. The apparatus of claim 2, further comprising at least one of optical fibers and imaging optics arranged in a beam path in front of the sensor elements.

9. The apparatus of claim 8, wherein the optical fibers are arranged as a matrix.

10. The apparatus of claim 8, comprising the imaging optics, wherein the imaging optics are configured to be adjustable relative to each other for at least one of compensating for chromatic aberration and axial and lateral positioning.

11. The apparatus of claim 8, wherein the at least one of optical fibers and imaging optics is configured to produce images of the elemental areas.

12. The apparatus of claim 2, wherein the filter arrangement is one of (i) integrated in a camera matrix of the detector system, (ii) arranged on a matrix surface positioned in front of the individual sensor elements, and (iii) provided between a beam splitter and the detector system.

13. The apparatus of claim 2, wherein the filter arrangement is integrated in a beam splitter mirror.

14. The apparatus of claim 2, wherein the filter arrangement comprises an arrangement of the optical filters in a chessboard pattern or a striped pattern or comprises an arrangement of optical single filter elements.

15. The apparatus of claim 2, wherein the sensor elements are arranged as a matrix or in any other desired geometric shape relative to one another.

16. The apparatus of claim 2, wherein the filter arrangement is mounted on or integrated in a beam splitter.

* * * * *

UNITED STATES PATENT AND TRADEMARK OFFICE
CERTIFICATE OF CORRECTION

PATENT NO. : 9,089,926 B2
APPLICATION NO. : 12/513081
DATED : July 28, 2015
INVENTOR(S) : Pfitzner et al.

Page 1 of 1

It is certified that error appears in the above-identified patent and that said Letters Patent is hereby corrected as shown below:

On the title page item [57], Line 7, delete "at least" and insert -- at at least --.

In the claims

Column 6, Line 26, Claim 1, delete "at least" and insert -- at at least --.

Column 6, Line 43, Claim 2, after "monitoring" insert -- a --.

Column 6, Line 50, Claim 2, before "elemental" delete "plurality of".

Column 7, Line 1, Claim 4, delete "wherein" and insert -- wherein the --.

Signed and Sealed this
Twelfth Day of January, 2016

Michelle K. Lee
*Director of the United States Patent and Trademark Office*